Oct. 27, 1936.  J. M. WILKINS  2,058,748
VALVE
Filed June 9, 1933  2 Sheets-Sheet 1
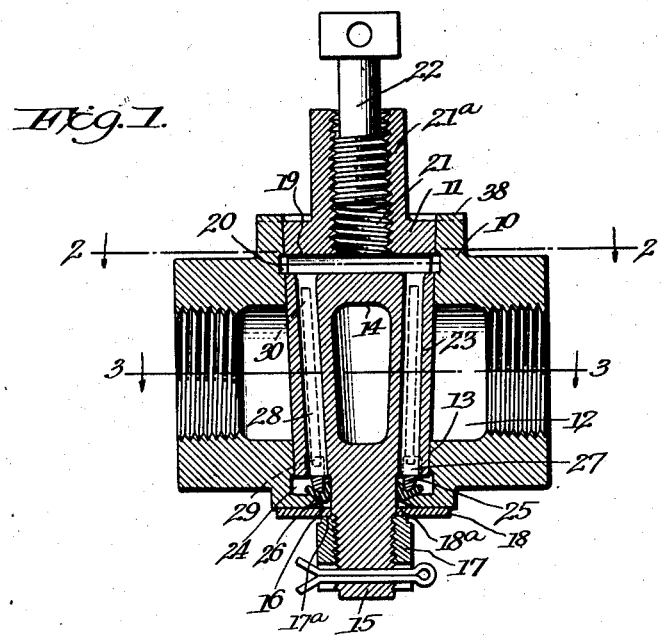
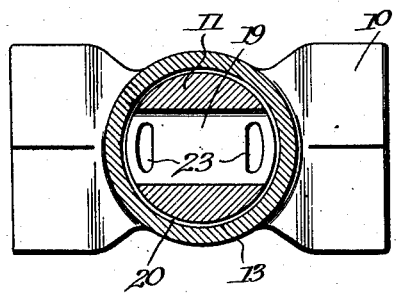
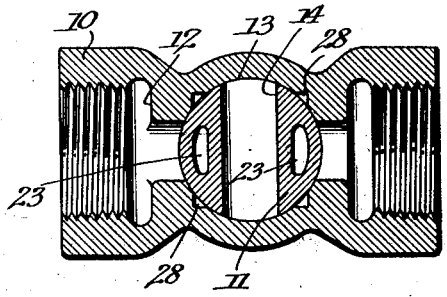
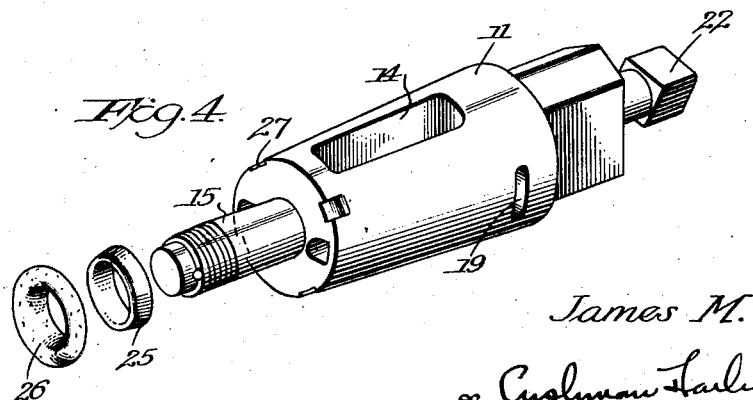
Inventor
James M. Wilkins,
By Cushman, Darby & Cushman
Attorneys Oct. 27, 1936.　　　J. M. WILKINS　　　2,058,748
VALVE
Filed June 9, 1933　　　2 Sheets-Sheet 2
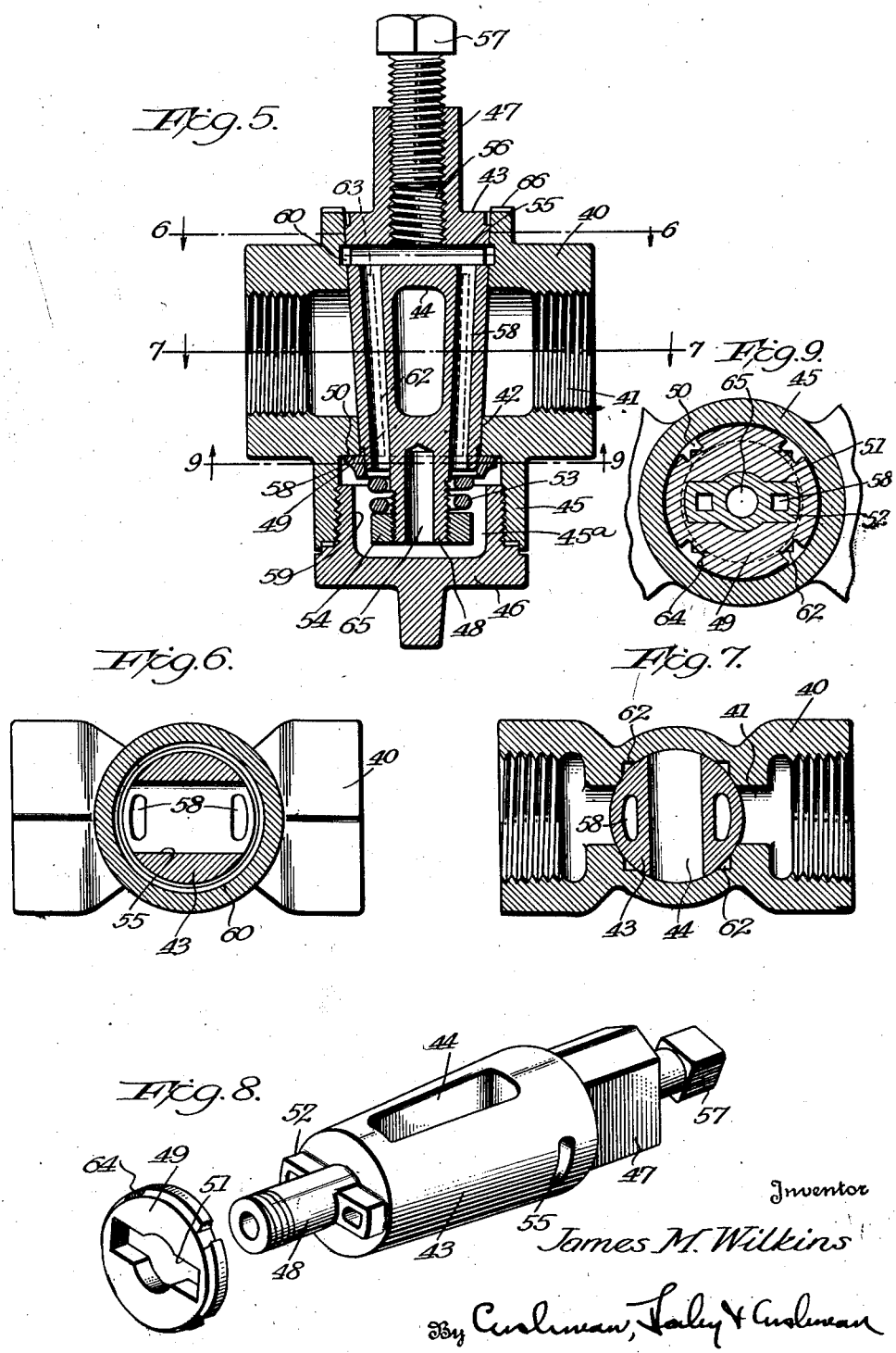

Patented Oct. 27, 1936

2,058,748

UNITED STATES PATENT OFFICE 2,058,748

VALVE

James M. Wilkins, Decatur, Ill., assignor to Mueller Co., Decatur, Ill., a corporation of Illinois Application June 9, 1933, Serial No. 675,137

4 Claims. (Cl. 251—93)

The present invention relates to valves and, more particularly, to an improvement in plug valves wherein the seating surfaces of the plug member and casing member are lubricated by forcing lubricant under pressure between these surfaces.

Lubricated valves of this type have heretofore been proposed wherein lubricating grooves or channels are provided in the seating surfaces, these grooves being supplied with grease under pressure in order to maintain the seating surfaces tightly sealed when the plug member of the valve is in either open or closed position. The arrangement of the seating surface grooves and the supply passage and pressure means of these prior valves has been relatively complicated.

Valves of the lubricated type are intended to be economical in manufacture because, in their production, the seating surfaces of the valve are not exactly machined or lapped and irregularities in these surfaces are sealed by the lubricant with which the valve is supplied. Obviously, if the lubricating grooves and passages are of a complicated arrangement, the economies effected by eliminating the necessity of fine machining may be more than offset.

The principal object of the present invention is to provide a lubricated valve including lubricating grooves in the seating surfaces, supply passages and pressure means for supplying lubricant and maintaining it under pressure, the grooves, passages and pressure means being so arranged that the valve will be of relatively simple construction and may be manufactured at less expense than has heretofore been possible.

An important object of the present invention is to provide a lubricated valve including lubricating grooves in the seating surfaces of the valve, lubricant supply passages to supply lubricant to the grooves and means for supplying lubricant to the passages and grooves and for maintaining the lubricant under pressure, the grooves, passages and pressure means all being so arranged that the valve will be of relatively simple construction and may be manufactured at minimum expense.

Still another object of the invention is to provide an arrangement of lubricating grooves and passages and means to exert pressure upon the lubricant in the grooves and passages, all of which are so arranged that the lubricant will be maintained at a maximum and constant pressure.

A further object of the invention is to provide a valve wherein the axial ends of the plug member are completely sealed against leakage, regardless of the position of the plug member.

A still further object of the invention is to provide a valve wherein pressure may be exerted upon the plug member to slightly lift it from its seat in the casing member when the plug member becomes seized with respect to the casing member. The invention also includes means to normally hold the plug member tightly seated with respect to the casing member.

Another object of the invention is to provide a valve provided with means to indicate the position of the plug member with respect to the casing member.

In one of the forms of my invention included in the present application, the valve is so constructed that the lubricant in the lubricating grooves and passages will be held under constant and maximum pressure without the use of any mechanical means for exerting such pressure.

Figure 1 is an axial section through one form of my valve;

Figure 2 is a horizontal sectional view on the line 2—2 of Figure 1;

Figure 3 is a horizontal sectional view on the line 3—3 of Figure 1;

Figure 4 is a view of the plug member of Figures 1 to 3, showing the parts thereof;

Figure 5 is an axial section through a modified form of my valve;

Figure 6 is a horizontal sectional view on the line 6—6 of Figure 5;

Figure 7 is a horizontal sectional view on the line 7—7 of Figure 5;

Figure 8 is a view of the plug member of Figures 5 to 7, showing the parts thereof; and Figure 9 is a horizontal sectional view on the line 9—9 of Figure 5.

Referring to Figures 1 to 4, inclusive, the numeral 10 designates the casing member of my valve and the numeral 11 indicates the plug member. The casing member 10 is provided with a passageway 12 for the flow of fluid therethrough and a tapered seat 13 extending transversely of the passageway 12. The plug member 11 is of tapered form to correspond to the seat 13 and is provided with a port 14 therethrough which is adapted to be aligned with the passageway 12 in the casing member 10 to place the valve in open position.

The plug member 11 has an integral threaded stud 15 at its lower end which projects through an aperture 16 in the wall of the casing member 10. The plug member 11 is held in contact with the seat 13 of the casing member by means of a nut 17 threaded on the stud 15, the inner end of the nut being reduced as shown at 17a and bearing upon a resilient washer 18 as shown in Figure 1. The edge of the aperture 16 against which the resilient washer 18 bears is preferably tapered or beveled as shown in Figure 1. A cotter pin may be used to hold the nut 17 in the desired adjusted position.

The upper end of the plug member 11 opposite the stud 15 has a transverse passageway or duct 19 therethrough, this duct being aligned with a circumferential groove 20 in the seat 13 of the casing member. A central longitudinal bore 21 extends from the transverse duct 19 and through the stem 21a at the upper end of the plug member. A threaded plunger 22 is threaded in the bore 21 and is adapted to be rotated in the bore to force lubricant from the transverse duct 19 through a series of ducts or passageways to lubricate the seating surfaces of the valve. Two passageways or ducts 23 extend longitudinally of the plug member 11 from the transverse duct 19, the lower ends of these ducts opening to a chamber 24 in the casing member 10. A washer 25 positioned about the stud 15 of the plug member within the chamber 24 bears against the ends of the ducts 23 but the washer is of insufficient size, in cross section, to entirely close the ends of the ducts. A flexible gasket 26 of substantially U-shape, in cross-section, fits over the opposite surface of the washer 25, the inner surface of the gasket bearing against the stud 15 and its outer and lower surface bearing against the tapered inner edge of the aperture 16 of the casing member 10 through which the stud 15 projects. The gasket 26 thereby serves to maintain a fluid tight seal between the stud 15 of the plug member and the casing member 10.

The plug member 11 is provided with indentations 27, preferably spaced 90° apart about its edge, which indentations open into the chamber 24 and extend a short distance upward along the body of the plug member. In the closed position of the plug member, the indentations 27 are adapted to communicate with the adjacent ends 29 of grooves or channels 28 preferably provided in the seat 13 of the casing member 10, the grooves being also spaced 90° apart about the seat so that they will be properly aligned with the indentations 27. As is shown in Figure 1, the lower ends 29 of the grooves 28 do not extend sufficiently far along the seating surface 13 to open to the chamber 24 and the upper ends 30 of the grooves also terminate at a point spaced below the annular groove 20 in the opposite end of the casing member 10. By this arrangement, the grooves 28 will not be in communication with the chamber 24 except when the indentations 27 in the plug member are aligned therewith.

In the operation of the valve, lubricant, for example, grease in stick form, may be positioned in the bore 21 after removal of the threaded plug 22. The threaded plug 22 may then be replaced and threaded down into the bore 21 so as to exert pressure on the grease. This will force the grease through the transverse duct 19 and downwardly through the longitudinal ducts 23 into the chamber 24. With the valve in closed position, the grease will move upwardly through the indentations 27 and into the grooves 28.

Immediately upon turning movement of the plug member 11, the indentations 27 will begin to move out of alignment and communication with their respective grooves 28 and grease in the grooves 28 will be smeared upon the seating surfaces during the rotation of the plug member. It will be noted that because neither the annular groove 20 nor the chamber 24 are in communication with the grooves 28, no grease will be lost from the grooves 28 except that which was placed in the grooves during their alignment with the indentations 27. In other words, the grease in the grooves 28 will not be under pressure at the time that the grooves may be exposed to the port 14 and passageway 12 during rotation of the plug member 11.

Some grease will move from the annular groove 20 to the seating surface between the groove and the passageway 12. The groove 20 and chamber 24 will thereby serve to maintain a tight seal at both ends of the plug member. Grease will also spread from the channels 28 along the seating surface to form a tight seal along portions of the seating surface which would not otherwise be tightly sealed because of irregularities in the seating surfaces.

In both open and closed positions of the plug member 11 with respect to the passageway 12, the indentations 27 will be aligned with the grooves 28, and as shown in the drawings, the groove and indentations will prevent leakage around the seating surfaces because the grease will be under pressure.

The arrangement of the grooves 28 whereby they do not extend into communication with the circumferential groove 20 permits greater pressure to be exerted upon the grease in the grooves because higher pressure can be built up in the stub end grooves than would be the case if the grooves were part of an endless circuit.

Should the plug member 11 become seized or stuck so that it cannot be turned in the casing member 10, the threaded plug 22 may be rotated to increase the pressure exerted upon the grease. The pressure of the grease will cause the plug member 11 to be very slightly raised from its seat so that it may be turned. The plug member is able to rise by reason of the fact that the inner edge 18a of the resilient washer 18 overlies the space provided by the aperture 16 between the stud 15 of the plug member 11 and the wall of the casing member 10, thus permitting the spring washer to yield slightly under pressure exerted thereon by the reduced end 17a of the nut 17. The spring action of the washer 18 will hold the plug member to its seat when the grease pressure is reduced.

It is to be noted that the gasket 26 is firmly clamped between the hard washer 25 and the seat formed in the casing member by the upper edge of the aperture 16. The flexibility of the gasket 26 will permit the plug member 11 to be slightly raised from its seat in the casing member without danger of fluid leakage at the small end of the plug member.

Figures 5 to 9 show a somewhat modified form of valve wherein the numeral 40 indicates a casing member having a passageway 41 therethrough and a tapered seat 42. A plug member 43 is positioned in the seat 42 and is provided with a port 44 for passage of fluid when the plug member is in open position with respect to the passageway 41. The casing member 40 is open at both ends of the seat 42, an annular outwardly projecting flange 45 being provided at the lower side of the casing member. The flange is threaded in order that a cap 46 may be positioned thereon to close this side of the casing member and form a chamber 45a.

The plug member 43 is provided with a stem 47 projecting from the upper end of the plug member 43 and a stud portion 48 projects from its lower end and into the chamber 45a. The plug 43 is held tightly in inward position with respect to the seat 42 by means of the washer or collar 49 positioned upon the lower end of the plug. The outer and upper surface of the washer 49 bears upon a shoulder 50 on the casing member 40 as shown in Figure 5. The washer 49 is provided with a key slot 51 which fits about the stud 48 and a key 52 on the lower end of the plug member. This arrangement insures that the washer 49 will turn with the plug member 43. A coil spring 53 encircles the stud 48 with its inner end bearing upon the washer 49, the spring being held under tension by a nut 54 threaded upon the lower end of the stud 48.

The plug member 43 is provided with a transverse duct 55 in its upper end, which duct communicates with a central longitudinal bore 56 extending through the valve stem 47. The bore 56 is adapted to be closed by a threaded plunger 57. Ducts 58 extend longitudinally of the plug member 43 from the transverse duct 55 to the lower end of the plug, these latter ducts opening into the chamber 45a. The casing member 40 is provided with a circumferential groove 60 in alignment with the transverse duct 55. The valve seat 42 of the casing member 40 is provided with longitudinal grooves or channels 62 which extend upwardly from a point opposite the upper surface of the washer 49. As shown in Figure 5, the upper ends 63 of the channels 62 terminate below and out of communication with the annular groove 60.

The washer 49 is provided with kerfs or indentations 64 preferably spaced about its edge at an angle 90° apart as shown in Figure 8. When the valve is fully closed or in open position, these kerfs will be aligned with the lower ends of the channels 62 as shown in Figure 9.

In operation, the valve may be supplied with lubricant by placing lubricant, for example, a stick of grease, in the bore 56. With the plug member in either open or closed position, when the threaded plunger 57 is screwed downwardly in the bore 56, the grease will flow through the transverse duct 55 and downwardly through the vertical ducts 58 to the chamber 45a. The grease will then flow upwardly through the kerfs 64 in the washer 49 and into the channels 62. A bore 65 is provided in the lower end of the stud 48 and grease will flow into this bore compressing the air present therein and thereby maintaining a constant pressure upon the grease in the valve.

Immediately the plug member is turned from either opened or closed position, the kerfs 64 will begin to move out of alignment with the lower ends of the grooves 62 so that the grease in the grooves will not be under pressure. The grooves 62 will only be in alignment with the indentations 64 when the plug member is in open or closed position. By this arrangement, no grease may be lost to the port 44 and passageway 41 except the grease which is in the grooves 62.

Should the plug member become stuck or seized to the seat 42, the threaded plunger 57 may be screwed inwardly to increase the pressure upon the grease and thereby raise the plug member slightly from the seat 42 against the action of the spring 53.

The operation of the valve of Figures 5 to 9 is otherwise similar to the valve of Figures 1 to 4.

The valves of both Figures 1 to 4 and Figures 5 to 9 may include indicating marks such as shoulders 38 and 66, as shown in Figures 1 and 5, respectively, on the casing members. The valve stems of the respective valves are provided with indicating markings which will be aligned with the shoulders on the casing members when the plug members are in either open or closed position.

It will be understood that the use of the terms "upper" and "lower" with respect to various parts of the valves is intended to be relative only and refers merely to the position of the valves as shown in the drawings.

It will be understood that the invention is not limited to the details of construction shown in the drawings and described in the specification and that the examples of the use of the various forms of the device which have been given do not include all of the uses of which the devices are capable; also, that the phraseology employed in the specification is for the purpose of description and not of limitation.

I claim:—

1. A valve comprising a casing member having a passageway for flow of fluid, a tapered seat formed transversely of the passageway, a tapered plug member rotatably disposed in the seat and having a port therethrough, the plug member extending through the casing member, a lubricant containing chamber in the casing member at the smaller end of the plug member, means to exert pressure upon the lubricant in the chamber to raise the plug member from its seat and means responsive to the pressure of the lubricant to seal the reduced end of the plug member with respect to the casing member when the plug member is raised from its seat.

2. A valve comprising a casing member having a passageway for flow of fluid, a tapered seat formed transversely of the passageway, a tapered plug member rotatably disposed in the seat and having a port therethrough, the casing member having an aperture therein through which the smaller end of the plug member extends, resilient means to normally hold the plug member upon its seat, means to lift the plug member from its seat and means responsive to the pressure of the lubricant to provide a seal in the aperture about the smaller end of the plug member.

3. A valve comprising a casing member having a passageway for flow of fluid, a tapered seat formed transversely of the passageway, a tapered plug member rotatably disposed in the seat and having a port therethrough, the larger end of the plug member projecting from the casing member and being provided with operating means, a chamber in the larger end of the plug member to receive lubricant, the casing member seat being provided with a groove extending circumferentially about the larger end thereof, the groove and chamber being constantly in communication so that the groove will form a seal about the larger end of the plug member, a second chamber in the casing member about the smaller end of the plug member, a longitudinal lubricating groove in the casing member seat, said groove terminating short of the circumferential groove and said second chamber, a longitudinal passage in the plug member to place said second chamber in communication with the chamber in the plug member, and means to place the chamber in the casing member in communication with the longitudinal groove of the casing member seat at predetermined positions of the plug member.

4. A valve comprising a casing member having a passageway for flow of fluid, a tapered seat formed transversely of the passageway, a tapered plug member rotatably disposed in the seat and having a port therethrough, the larger end of the plug member projecting from the casing member and being provided with operating means, a chamber in the larger end of the plug member to receive lubricant, the casing member seat being provided with a groove extending circumferentially about the larger end thereof, the groove and chamber being constantly in communication so that the groove will form a seal about the larger end of the plug member, a second chamber in the casing member about the smaller end of the plug member, a longitudinal lubricating groove in the casing member seat, said groove terminating short of the circumferential groove and said second chamber, a longitudinal passage in the plug member to place said second chamber in communication with the chamber in the plug member, means to place the chamber in the casing member in communication with the longitudinal groove of the casing member seat at predetermined positions of the plug member, means to increase the pressure upon the lubricant, and means at the smaller end of the plug member to normally hold it upon the casing member seat.

JAMES M. WILKINS.